United States Patent
Berels et al.

(10) Patent No.: US 10,622,612 B2
(45) Date of Patent: Apr. 14, 2020

(54) LOW VOLTAGE BUS BAR IN HIGH VOLTAGE BATTERY ENCLOSURE

(71) Applicant: FORD GLOBAL TECHNOLOGIES, LLC, Dearborn, MI (US)

(72) Inventors: David J. Berels, Plymouth, MI (US); Douglas B. Thornburg, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 15/956,837

(22) Filed: Apr. 19, 2018

(65) Prior Publication Data

US 2019/0326582 A1  Oct. 24, 2019

(51) Int. Cl.
*B60K 1/04* (2019.01)
*H01M 2/10* (2006.01)
*H01M 2/20* (2006.01)
*H01M 2/30* (2006.01)
*B60L 50/64* (2019.01)

(52) U.S. Cl.
CPC .............. *H01M 2/206* (2013.01); *B60K 1/04* (2013.01); *B60L 50/64* (2019.02); *H01M 2/1077* (2013.01); *H01M 2/1083* (2013.01); *H01M 2/305* (2013.01); *B60K 2001/0405* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 1,823,066 A * | 9/1931 | Shapiro | H01M 2/105 429/159 |
| 2,702,310 A * | 2/1955 | Kaye | H01M 6/44 429/151 |
| 9,450,225 B2 | 9/2016 | Nakayama | |
| 9,490,460 B2 | 11/2016 | Yanagi | |
| 9,722,223 B1 | 8/2017 | Maguire | |
| 9,819,062 B2 | 11/2017 | Mascianica et al. | |

(Continued)

FOREIGN PATENT DOCUMENTS

| CN | 204138587 U | 2/2015 |
|---|---|---|
| CN | 206679475 U | 11/2017 |
| CN | 206742295 U | 12/2017 |

*Primary Examiner* — Haroon S. Sheikh
(74) *Attorney, Agent, or Firm* — Frank L. Lollo; MacMillan, Sobanski & Todd, LLC

(57) ABSTRACT

An electric propulsion vehicle has a high voltage electric drive system and a low voltage electrical accessory system. A high voltage battery pack provides electrical power at a relatively higher voltage for a traction motor. A low voltage distribution system is routed within the vehicle carrying a relatively lower voltage for the accessory system. A molded battery enclosure contains the battery pack and extends between predetermined locations in the vehicle body/frame. The low voltage distribution system includes a bus bar retained in the enclosure and electrically isolated from the battery pack. The bus bar has exposed terminal ends accessible at the predetermined locations. Incorporating the low voltage bus bar into the high voltage battery enclosure reduces the packaging space for the low voltage distribution system while simultaneously strengthening the enclosure.

17 Claims, 4 Drawing Sheets

(56) References Cited

U.S. PATENT DOCUMENTS

| | | |
|---|---|---|
| 9,853,263 B2 | 12/2017 | Baek et al. |
| 2015/0207127 A1 | 7/2015 | Davis et al. |
| 2015/0318525 A1 | 11/2015 | Maguire et al. |
| 2015/0357682 A1 | 12/2015 | Farha et al. |
| 2016/0093864 A1 | 3/2016 | Nakamura et al. |
| 2016/0218335 A1 | 7/2016 | Baek |
| 2017/0018755 A1 | 1/2017 | DeKeuster et al. |
| 2017/0346144 A1 | 11/2017 | Addanki et al. |
| 2018/0026248 A1* | 1/2018 | Fehner .................... H01M 2/20 429/161 |
| 2018/0083231 A1 | 3/2018 | Haag et al. |

* cited by examiner

_US 10,622,612 B2_

LOW VOLTAGE BUS BAR IN HIGH VOLTAGE BATTERY ENCLOSURE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive electrical distribution systems, and, more specifically, to an electric motor driven vehicle with a high voltage battery enclosure supporting a portion of a low voltage distribution system.

An important issue in the manufacture of automotive vehicles relates to the packaging of vehicle wiring in view of the with growing number of electronic modules and features. In particular, the packaging of power distribution cables with large diameters is difficult due to the limited availability of package space and the need to keep long runs of cables separate from other wiring in order to minimize EMI susceptibility.

Electric propulsion vehicles (e.g., battery electric and gas-electric hybrids) is a growing vehicle segment. Electric vehicles typically have a two-part electrical system having 1) a high voltage (HV) portion with an HV battery pack and an HV wiring system between the HV battery pack, an inverter, and a traction motor, and 2) a low voltage (LV) portion with an LV battery and an LV wiring system interconnecting LV accessories and modules. The high voltage of the battery pack is obtained by interconnecting a plurality of battery cells that are housed in a battery enclosure (e.g., battery tray). The HV battery pack may occupy significant packaging space in areas of the vehicle which must also support the LV wiring distribution system.

SUMMARY OF THE INVENTION

In one aspect of the invention, an electric traction vehicle comprises a vehicle body/frame. A high voltage battery pack provides electrical power at a relatively higher voltage for a traction motor. A low voltage distribution system is routed within the vehicle carrying a relatively lower voltage and configured to interconnect a plurality of low voltage accessories. A molded battery enclosure contains the battery pack and extends between predetermined locations in the body/frame. The low voltage distribution system includes a bus bar retained in the enclosure and electrically isolated from the battery pack. The bus bar has exposed terminal ends accessible at the predetermined locations. Incorporating the low voltage bus bar into the high voltage battery enclosure reduces the packaging space for the low voltage distribution system while simultaneously strengthening the enclosure.

DETAILED DESCRIPTION OF PREFERRED EMBODIMENTS

In order to distribute low voltage power within a vehicle, the invention deploys a bus bar integrated with a high voltage battery enclosure and having appropriate end terminals to connect with different sections of an LV distribution system. The bus bar can, for example, be an aluminum rod molded into or otherwise retained in the enclosure. The integrated bus bar saves mass and packaging space over traditional cable wiring for the distance occupied by the battery pack.

Battery enclosures (e.g., a tray and lid) are often made from thermoplastic or thermal-set fiberglass materials. Certain embodiments of the invention can use high-pressure injection molding, blow molding, Sheet Molded Compound (SMC) molding with a heated press mold, or Resin Transfer Molded (RTM) molding in order to embed the bus bar within a wall of the tray or lid. These or other known process technologies can be used to over-mold the bus bar so that it is electrically isolated from the HV battery or conductors. These over-molding processes allow material to flow over and around the metal bus bar, while leaving ends of the bus bar accessible (i.e., uncovered) at connection terminals. The connection terminals have attachment points such as a bolted joint or a blade terminal that may be attached directly. The integrated bus bar may have intermediate connection terminals to facilitate electrical connections at midpoints along the battery pack. The end and/or intermediate terminal connections may be joined to power distribution boxes of an LV power distribution system, for example.

In addition to the benefits of saving packaging space and reducing manufacturing costs and parts count, the molding of a metal bus bar into the battery pack can also add rigidity to the battery pack enclosure. This helps in maintaining the integrity of the HV battery especially during crash events.

Figure 1:
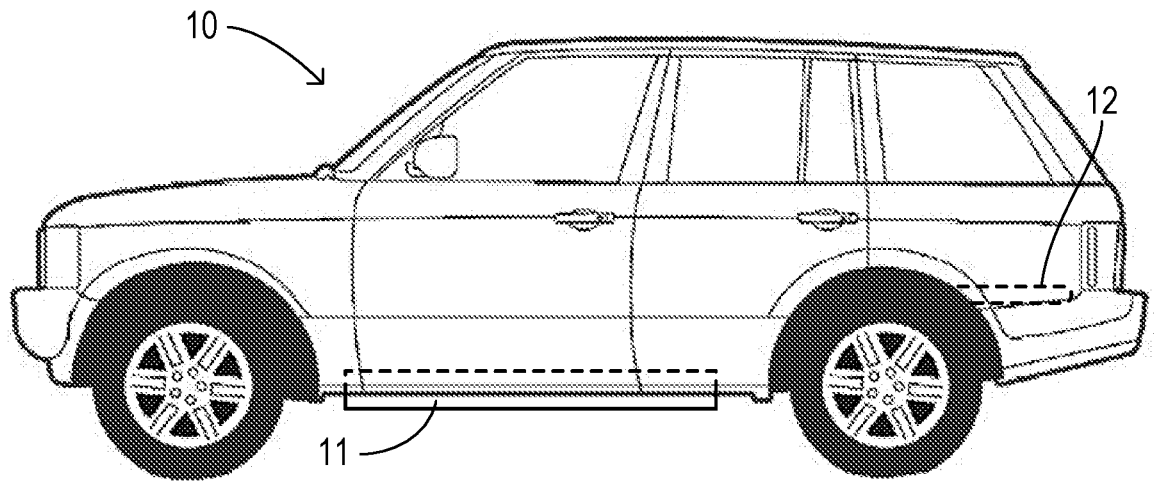
FIG. 1 is a side view of an electric propulsion vehicle showing some conventional locations for packing of an HV battery pack.

Referring now to FIG. 1, an electrified vehicle 10 has a battery pack 11 that powers an electric motor via an inverter (not shown). Battery pack 11 is attached to an underbody of vehicle 10. Consequently, it may have a relatively small vertical height while having a significant front-to-back length and side-to-side width. Thus, battery pack 11 extends between various predetermined locations within vehicle 10 separated by significant distances and between which LV power needs to be distributed. A rear floor region 12 is another space where a battery pack may be installed and which may also need to be traversed by an LV distribution system.

Figure 2:
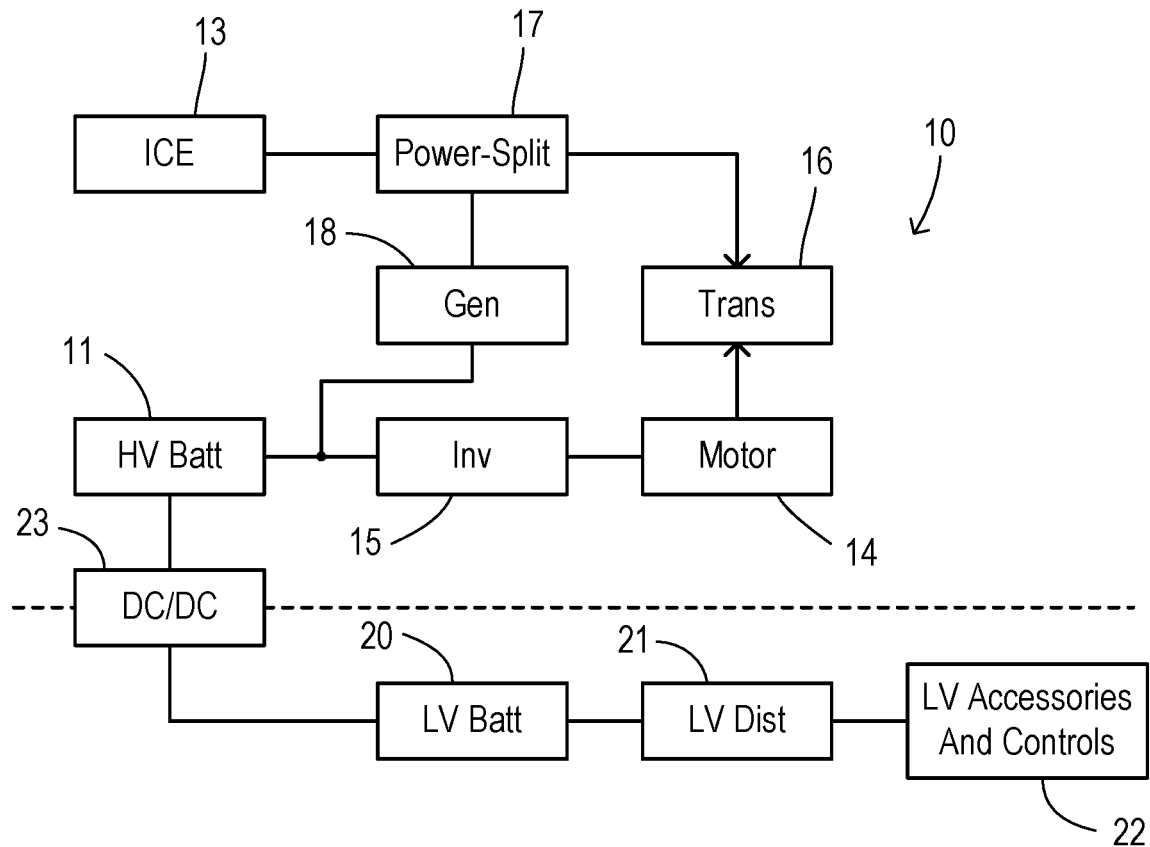
FIG. 2 is a block diagram showing one embodiment of an electric vehicle.

Vehicle 10 is shown in greater detail in FIG. 2 as a hybrid electric vehicle. Although a powersplit hybrid layout is shown, the present invention is also applicable to any type of electric vehicle (e.g., HEV, PHEV, or a fully electric vehicle). An internal combustion engine 13 and HV battery pack 11 supply energy for propelling vehicle 10. Battery 11 drives an electric traction motor 14 via an HV inverter 15. Motor 14 has an output coupled to transmission gears 16 for driving the vehicle wheels (not shown). A mechanical output of engine 13 is coupled to gears 16 via a splitting device 17 for providing an engine-driven mode of the powertrain. Splitting device 17 also couples gears 16 to a generator 18 so that during regenerative braking, available mechanical power from the wheels can be used to rotate generator 18, with recovered energy being used to charge battery 11 as known in the art.

Vehicle 10 also has a low voltage electrical system including an LV battery 20, LV distribution system 21, and LV accessories/controls 22. LV battery 20 may be recharged via a DC/DC converter 23 powered from the HV system (e.g., HV battery 11). LV battery 20 may have a voltage of about 12V, while HV battery 11 may have an output voltage of about 60V to 800V. LV distribution system 21 may include wiring cables/harnesses, power distribution boxes, and various kinds of connectors, as known in the art. LV accessories/controls includes electronics modules and components making use of low voltage power.

Figure 3:
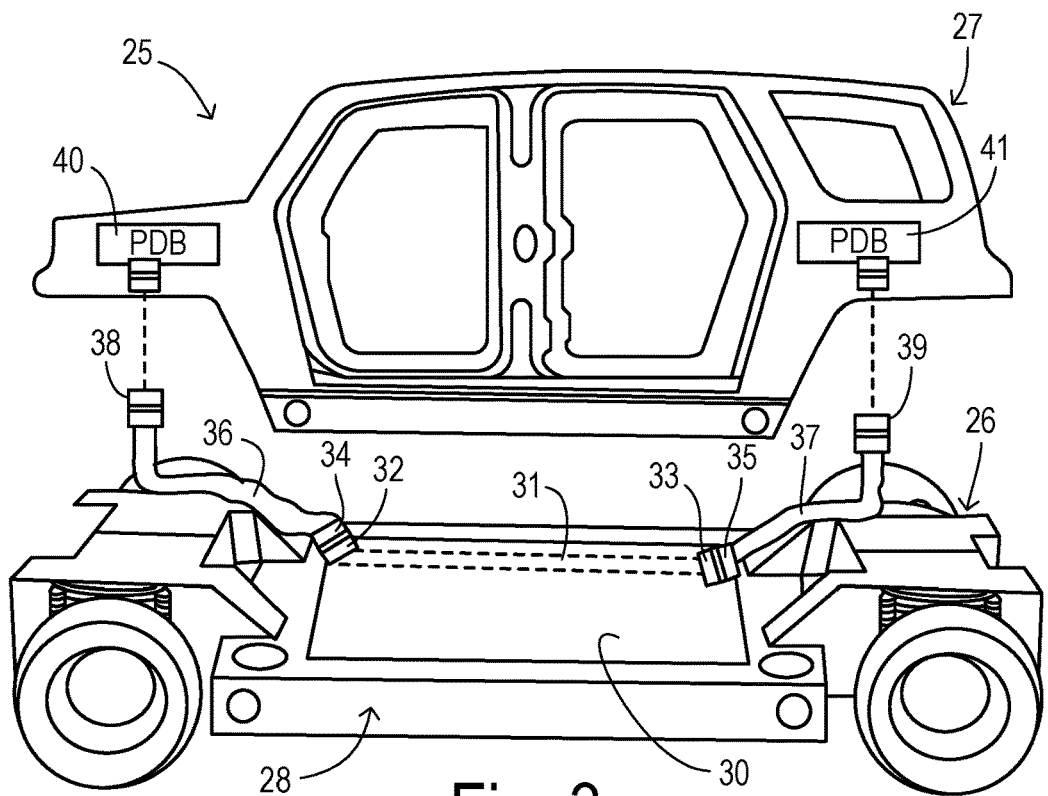
FIG. 3 is an exploded view of a vehicle body/frame showing a battery pack with integrated LV bus bar in one embodiment of the invention.

FIG. 3 shows one preferred arrangement for integrating an LV bus bar with an HV battery enclosure. A vehicle 25 has a body/frame including a chassis portion 26 and a body portion 27. As used herein, a body/frame may be comprised of a unibody construction, an upper body attached to a lower frame, or any other type of vehicle construction. In FIG. 3, chassis portion 26 supports a battery pack 28 with a lid or cover 30. Embedded within lid 30 is an LV aluminum bus bar 31 with terminal connectors 32 and 33 accessible at opposite ends. Connectors 32 and 33 are disposed at predetermined locations within vehicle 25. Also disposed at the predetermined locations are mating connectors 34 and 35 of power cables 36 and 37. Connectors 38 and 39 at the other ends of cables 36 and 37 connect to power distribution boxes (PDB) 40 and 41, respectively.

Figure 4:
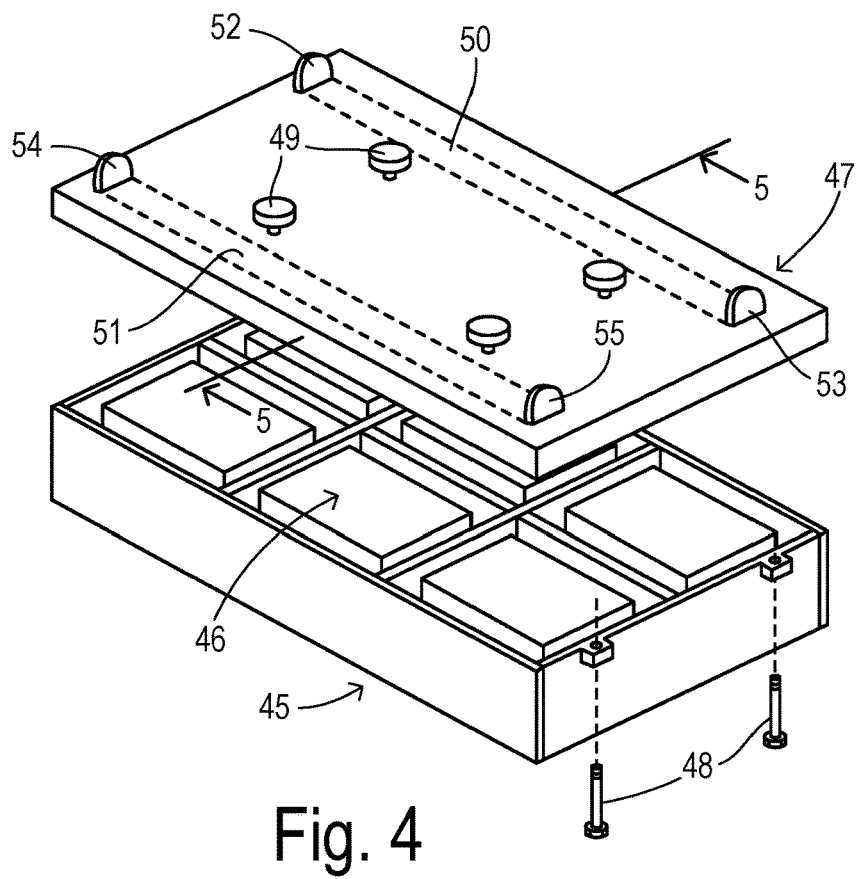
FIG. 4 is an exploded perspective view of a battery enclosure with integrated LV bus bar in another embodiment of the invention.

FIG. 4 provides greater detail regarding one embodiment of a battery pack, molded enclosure, and bus bars of the invention. A lower tray 45 has molded side walls, bottom wall, and interior walls defining interior compartments receiving a plurality of battery cells 46. Cells 46 are interconnected via HV bus bars (not shown). HV bus bars and external HV connector terminals (not shown) are kept electrically isolated from an LV bus bar system that is also retained within the molded enclosure. In this embodiment, an upper lid 47 is sealed to lower tray 45 using fasteners 48. Protrusions 49 extending from lid 47 are used to suspend the battery pack from a downward-facing surface of a body/frame, as described in U.S. Pat. No. 9,722,223, which is incorporated herein by reference.

Figure 5:
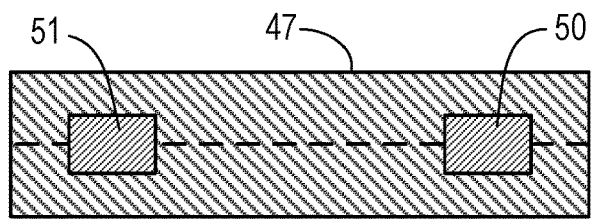
FIG. 5 is a cross-sectional view of the battery lid of FIG. 4 taken along line 5-5.

Molded lid 47 carries embedded aluminum bus bars 50 and 51. Bus bar 50 emerges from lid 47 to provide blade terminals 52 and 53, and bus bar 51 emerges from lid 47 to provide blade terminals 54 and 55. By virtue of being embedded within lid 47, bus bars 50 and 51 are insulated from any HV elements. As shown in FIG. 5, bus bars 50 and 51 are surrounded by an electrically-insulating thermoplastic material as a result of an over-molding process. Lid 47 may include upper and lower polymeric sheets that are compressed to form an SMC body around each bus bar, for example.

Figure 6:
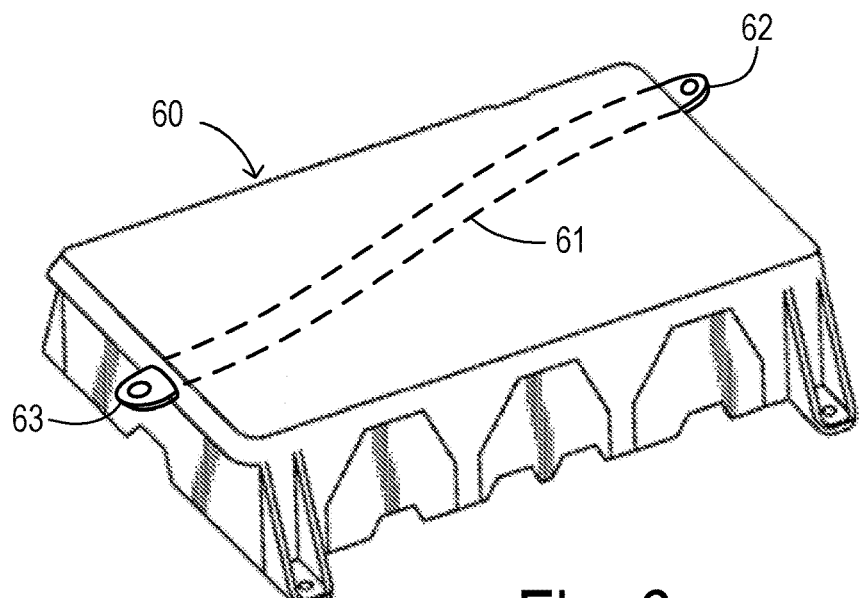
FIG. 6 is a perspective view of a battery enclosure with integrated LV bus bar in another embodiment of the invention.

FIG. 6 illustrates another embodiment of the invention wherein a molded enclosure 60 has a configuration that has been used for installing a battery pack in a rear cargo area of a vehicle. Enclosure 60 has an upper wall or lid embedding a bus bar 61. Exposed terminal ends 62 and 63 extend at predetermined locations where connections are to be made to a low voltage distribution system in the vehicle. The locations can be anywhere along the perimeter of enclosure 60 by forming bus bar 61 with a corresponding curvature. In this embodiment, terminals 62 and 63 are formed as eyelet terminals.

Figure 7:
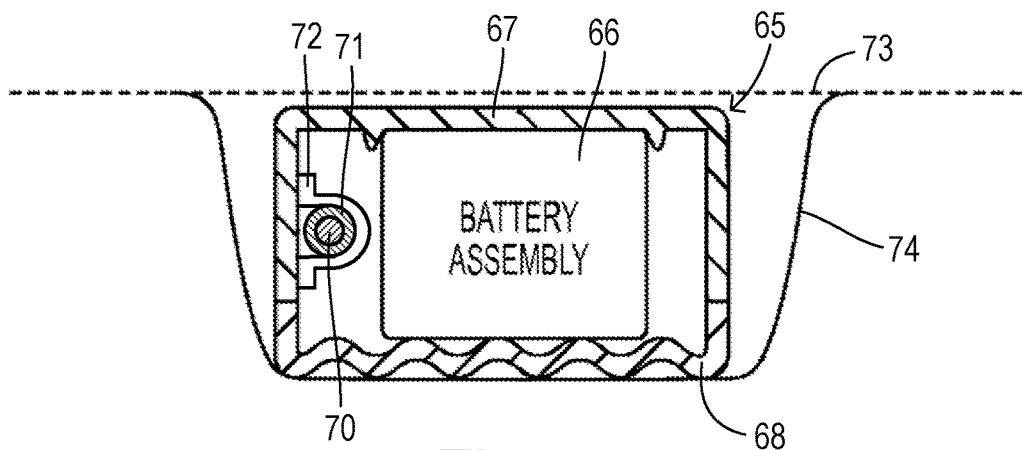
FIG. 7 is a lateral, cross-sectional view of another embodiment of a battery pack with an LV bus bar integrated within the battery enclosure.

FIG. 7 illustrates yet another embodiment of the invention wherein a battery pack 65 is comprised of a battery cell assembly 66 is retained in an enclosure cavity between an upper tray 67 and a lower cover 68. A metal bus bar 70 with an insulative jacket 71 is retained in the enclosure cavity by attaching it to an interior side of a wall of tray 67 using clamps 72. Since bus bar 70 is a separate component rather than being embedded in the wall, jacket 71 provides the electrical isolation from HV battery assembly 66. Appropriate sealed openings (not shown) are provided through tray 67 and/or cover 68 to provide terminal connections to bus bar 70 at the desired locations. Battery pack 65 is fastened to a bottom surface 73 of a vehicle body/frame using a support strap 74 as known in the art.

Figure 8:
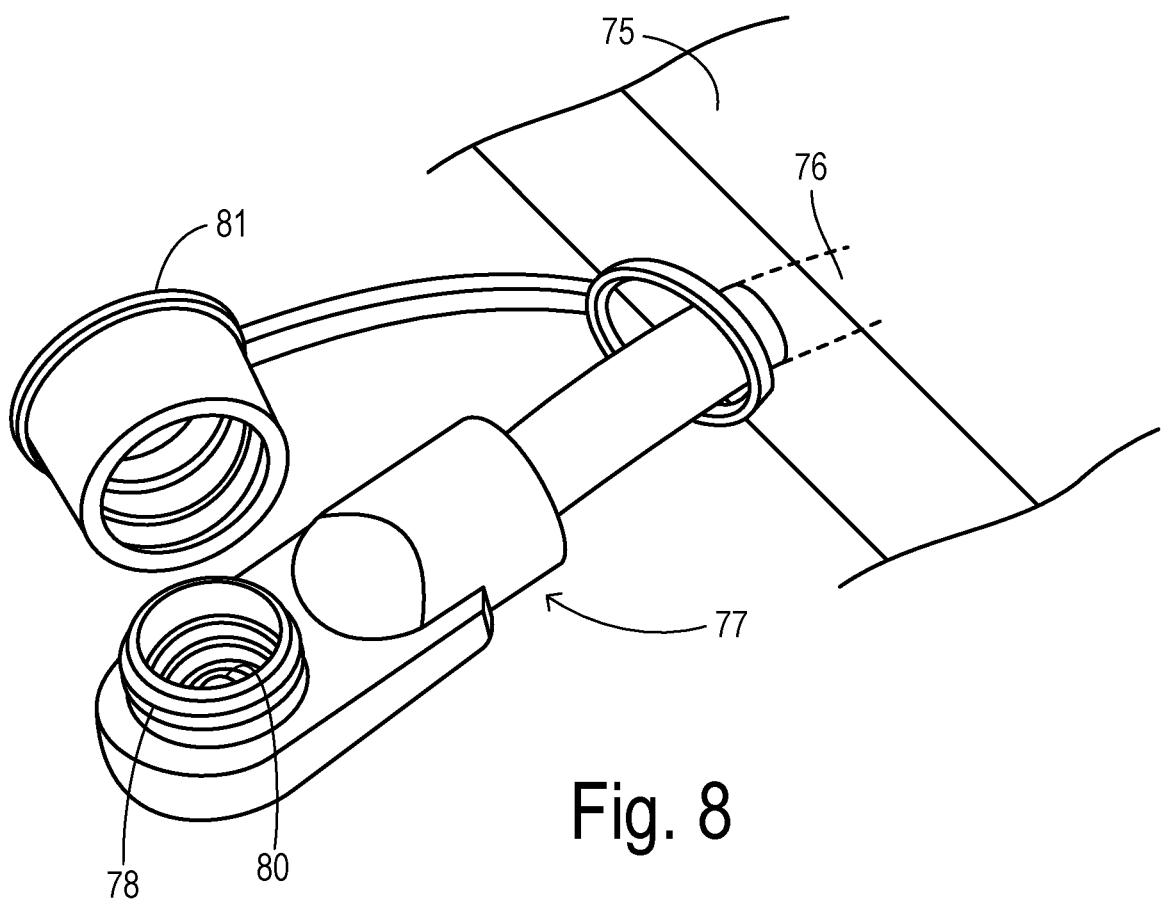
FIG. 8 shows is a perspective view showing one embodiment of a terminal connection to an integrated bus bar in greater detail.

FIG. 8 shows an embodiment of a terminal end connector in greater detail. A molded enclosure wall 75 has an embedded bus bar 76 which emerges from wall 75 into a connector 77. Connector 77 has an eyelet terminal 80 within an overmolded body and accessible via an open collar 78. A cap 81 is provided for sealing open collar 78 when a connection is not being made with terminal 80. Terminal 80 may preferably include a threaded portion in order to receive a threaded external connector as known in the art.

Figure 9:
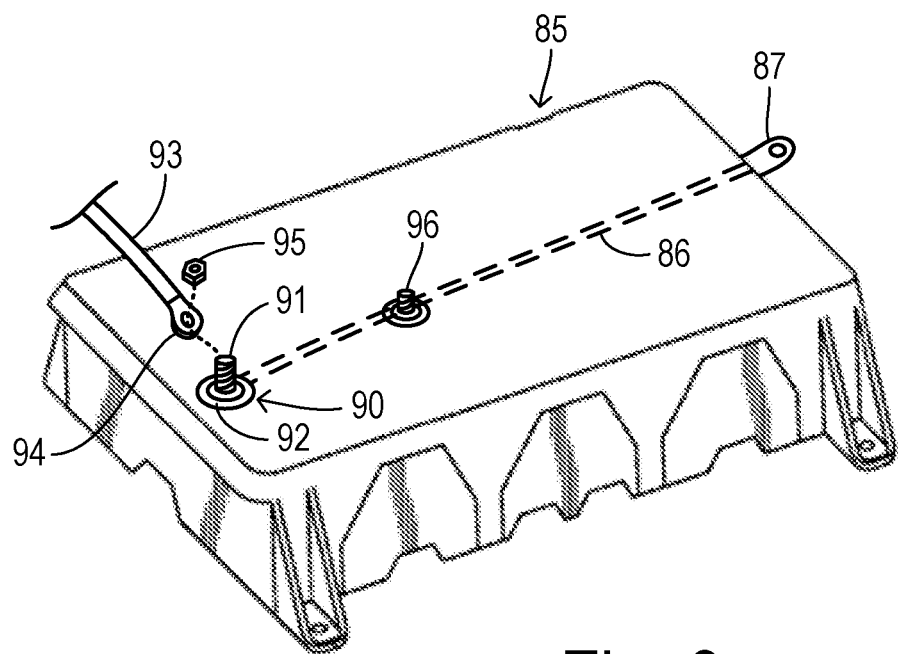
FIG. 9 shows is a perspective view showing a battery enclosure with another embodiment of a terminal connection to an integrated bus bar.

FIG. 9 shows another battery enclosure 85 with an embedded bus bar 86 with an eyelet terminal at one end. The other end of bus bar 86 has a terminal end 90 formed by a stud 91 and base 92. Stud 91 is threaded so that an eyelet terminal 94 of a cable 93 in the LV distribution system can be retained in electrical continuity with stud 91 by a hex nut 95.

An intermediate connection with bus bar 86 is obtained using an intermediately placed stud 96. Stud 96 extends from bus bar 86 and out from enclosure 85 to receive a connector (not shown) at a corresponding location in the LV distribution system.

What is claimed is:
1. An electric traction vehicle comprising:
   a vehicle body/frame;
   a high voltage battery pack providing electrical power at a relatively higher voltage for a traction motor;
   a low voltage distribution system routed within the vehicle carrying a relatively lower voltage and configured to interconnect a plurality of low voltage accessories; and
   a molded battery enclosure containing the battery pack and extending between predetermined locations in the body/frame;
   wherein the low voltage distribution system includes a bus bar retained in the enclosure and electrically isolated from the battery pack, and wherein the bus bar has exposed terminal ends accessible at the predetermined locations.

2. The vehicle of claim 1 wherein the bus bar is comprised of an aluminum rod disposed in the enclosure with terminal connections outside the enclosure at the exposed terminal ends of the aluminum rod.

3. The vehicle of claim 2 wherein at least one terminal connection is comprised of a bladed terminal.

4. The vehicle of claim 2 wherein at least one terminal connection is comprised of an eyelet terminal.

5. The vehicle of claim 2 further comprising an intermediate connector outside the enclosure and extending into the enclosure to join with an intermediate section of the bus bar.

6. The vehicle of claim 1 wherein the bus bar is embedded within a wall of the enclosure.

7. The vehicle of claim 6 wherein the enclosure is box-shaped having a lid, and wherein the bus bar is embedded within the lid.

8. The vehicle of claim 1 wherein the enclosure is formed by compression molding of polymeric sheets over the bus bar.

9. The vehicle of claim 1 wherein the enclosure is formed by resin transfer molding of polymeric material over the bus bar.

10. The vehicle of claim 1 wherein at least a portion of the bus bar is disposed in an interior chamber of the enclosure.

11. A molded enclosure for a traction battery pack in a vehicle, comprising:
   a molded tray with a chamber configured to contain the battery pack; and
   a molded lid attached to the tray, sealing the chamber;
   wherein the lid includes a bus bar retained in the enclosure and electrically isolated from the battery pack, the bus bar having exposed terminal connectors outside the enclosure at opposing ends to connect to a low voltage distribution system.

12. The enclosure of claim 11 wherein the bus bar is comprised of an aluminum rod embedded in the lid.

13. The enclosure of claim 11 wherein at least one terminal connector is comprised of a bladed terminal.

14. The enclosure of claim 11 wherein at least one terminal connector is comprised of an eyelet terminal.

15. The enclosure of claim 11 further comprising an intermediate connector outside the enclosure and extending into the enclosure to join with an intermediate section of the bus bar.

16. The enclosure of claim 11 wherein the lid is formed by compression molding of polymeric sheets over the bus bar.

17. The enclosure of claim 11 wherein the lid is formed by resin transfer molding of polymeric material over the bus bar.

* * * * *